United States Patent [19]

Crucius et al.

[11] Patent Number: 5,699,281
[45] Date of Patent: Dec. 16, 1997

[54] METHOD AND APPARATUS FOR MAPPING A WAREHOUSE RACK STRUCTURE FOR A STORAGE AND RETRIEVAL MACHINE

[75] Inventors: Wesley Crucius; Robert C. Hofstetter, both of Brookfield; Randall M. Schneider, Pewankee, all of Wis.

[73] Assignee: HK Systems, Inc., New Berlin, Wis.

[21] Appl. No.: 558,229

[22] Filed: Nov. 17, 1995

[51] Int. Cl.$^6$ .................. G01C 1/02; B43L 13/00
[52] U.S. Cl. .............. 364/561; 364/424.07; 364/472.04; 414/277; 414/279
[58] Field of Search .................. 364/561, 424.07, 364/472.04, 472.06, 478, 444; 414/277, 279, 281, 282, 253, 273; 312/201, 198

[56] References Cited

U.S. PATENT DOCUMENTS

| | | | |
|---|---|---|---|
| 4,178,994 | 12/1979 | Ito et al. | 169/52 |
| 4,319,662 | 3/1982 | Liston | 182/13 |
| 4,428,708 | 1/1984 | Burt | 414/275 |
| 4,564,085 | 1/1986 | Melocik et al. | 414/273 |
| 4,773,807 | 9/1988 | Kroll et al. | 414/282 |
| 4,967,130 | 10/1990 | Sorensen et al. | 318/652 |
| 5,018,926 | 5/1991 | Sternad | 414/253 |
| 5,044,859 | 9/1991 | Sorensen et al. | 414/273 |
| 5,091,685 | 2/1992 | Sorensen et al. | 318/652 |
| 5,141,118 | 8/1992 | Gay | 211/151 |
| 5,170,863 | 12/1992 | DeVroy | 414/281 |
| 5,187,664 | 2/1993 | Yardley et al. | 364/424.02 |
| 5,281,901 | 1/1994 | Yardley et al. | 318/587 |
| 5,341,130 | 8/1994 | Yardley et al. | 340/825.06 |
| 5,361,481 | 11/1994 | Lloyd et al. | 29/469 |
| 5,397,211 | 3/1995 | Lloyd et al. | 414/282 |
| 5,405,232 | 4/1995 | Lloyd et al. | 414/282 |

*Primary Examiner*—Emanuel T. Voeltz
*Assistant Examiner*—Bryan Bui
*Attorney, Agent, or Firm*—Nilles & Nilles, S.C.

[57] ABSTRACT

A method of mapping a warehouse rack structure having a plurality of racks comprises the steps of creating a logical matrix and updating the logical matrix. The updating step further includes the steps of causing a moveable device to travel to a first one of the plurality of racks, and producing a first machine-readable distance measurement output. The machine-readable distance measurement output is produced using a first sensor and represents a distance between the first sensor and a first position on the warehouse rack structure. A system for mapping a warehouse rack structure comprises a storage and retrieval machine; a rack structure; a logical matrix; and a computer. The storage and retrieval machine has first and second ultrasonic sensors mounted thereon. The rack structure includes a plurality of racks. The logical matrix stores horizontal position information and vertical position information for each of the plurality of racks. The computer updates the logical matrix based on distance measurements made by the first and second ultrasonic sensors.

26 Claims, 4 Drawing Sheets

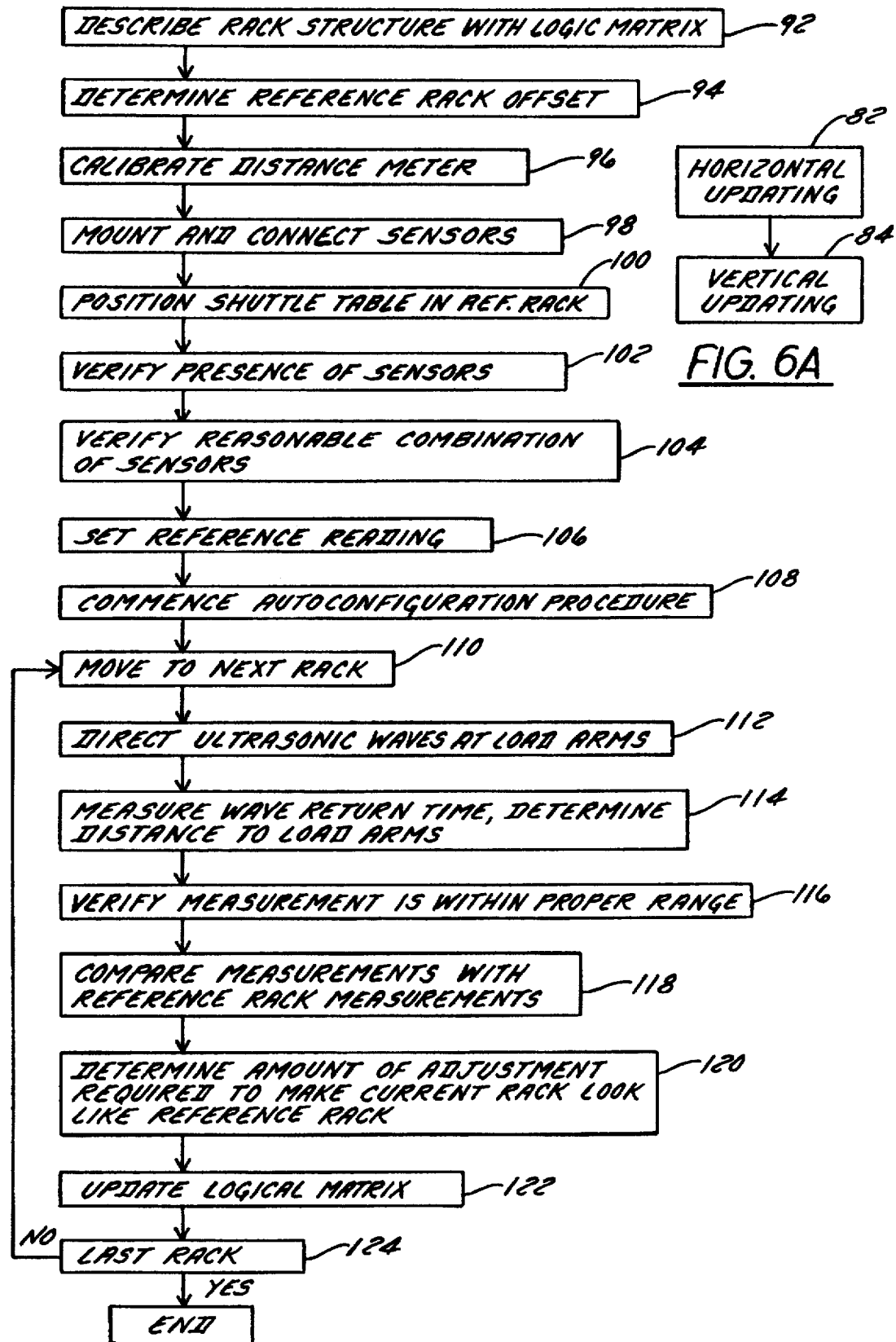

METHOD AND APPARATUS FOR MAPPING A WAREHOUSE RACK STRUCTURE FOR A STORAGE AND RETRIEVAL MACHINE

FIELD OF THE INVENTION

The present invention relates to the mapping of warehouse rack structures, and in particular to the mapping of warehouse rack structures for storage and retrieval machines.

DESCRIPTION OF RELATED ART

Storage and retrieval machines (SRMs) are well known, inter alia, for removing load objects from warehouse racks and transporting them to distant destinations. As illustrated in FIG. 1, an SRM 10 travels on a rail 15 along an aisle between a rack structure 21. The rack structure 21 is divided into a first rack sub-structure 22 and a second rack sub-structure (not illustrated), such that the first and second rack structures are disposed on either side of the rail 15. The rack structure 21 comprises a plurality of racks 23 including an individual rack of interest 20. Further, the SRM 10 has a base 12 on which is mounted a mast 14 supporting a lift carriage 16.

When it is desired for the SRM 10 to deposit (or retrieve) a load 44 from the rack 20 of the rack structure 21, the SRM 10 travels horizontally along the rail 15 to the column of racks in which the rack 20 is located. The lift carriage 16 then ascends to the rack 20 and a shuttle 19 extends to deposit the load 44. The shuttle 19 typically comprises a shuttle table 17 including a series of plates which extend in telescoping fashion into the rack 20, and then retract once the load 44 is retrieved or deposited.

To ensure proper operation, it is essential that a SRM computer 18 know the exact location of the rack 20. If the computer 18 does not know the exact location of the rack 20, the load 44 may not be deposited properly in the rack 20. Instead, the pallet supporting the load 44 may strike one of the vertical columns 28a and 28b supporting the rack structure 21, causing the pallet to spin and fall to the floor. Given that the racks 23 can be 100 feet or more above the ground, this is obviously an undesirable situation. For loads which are valuable (e.g., an expensive piece of machinery such as a jet engine), the use of an SRM system as a practical matter is no longer an option in such a situation.

It is therefore apparent that a system for mapping the exact locations of racks in the rack structure 21 is needed. Generally, the first step in this process is to describe the warehouse with a logical matrix 50, illustrated in FIG. 2. Typically, the logical matrix 50 is an N×M two dimensional matrix (N being the number of levels, M being the number of bays). Each cell in the matrix stores information about the vertical and horizontal location of a respective rack. For example, coordinates X,Y are stored which represent the distance from a known reference point 55 to a desired entry point in the rack. The desired entry point may be a point which is centered horizontally with respect to two load arms 24a and 24b of the rack structure 21, and which is vertically slightly below the tops 32a and 32b of the load arms 24a and 24b. (Each cell may additionally contain a third coordinate Z describing the required distance for the shuttle 19 to extend to properly retrieve or deposit a load in the rack.)

The logical matrix 50 is necessary because it is not possible, without more, to give the SRM a very general instruction such as "go to the n,mth rack." The SRM must be given the exact location of the rack 20, because the racks 23 of the rack structure 21 are generally not uniformly spaced. For example, halfway down the rack structure 21 there might be an access corridor which alters the spacing of the racks. Also, different rack columns in the same warehouse may have different widths.

Typically, the initial version of the logical matrix 50 is compiled based on blueprints used to build the rack structure 21. If the blueprints were completely accurate, then the process of mapping the rack structure 21 could stop with the creation of the initial logical matrix 50 based on the blueprints. However, for various reasons, the locations of the racks 23 as described by the blueprints are never completely accurate. For example, rack structures are never perfectly built. The rack structure 21 may lean to one side, and/or the support columns may be curved rather than extending straight up and down. Also, extreme temperature conditions in the warehouse may cause the metal in the rack structure 21 to expand or contract. For example, if the rack structure 21 was built at room temperature, but the warehouse is generally kept at sub-zero temperatures, then there will be a substantial amount of contraction which causes the actual rack structure 21 to be different than that shown in the blueprints.

Given that the actual rack structure 21 is likely to be different than that described in the blueprints, it is apparent that a system is needed for updating the initial logical matrix 50 created based on the blueprints. To date, two prior art systems have been developed.

A first prior art method is to have a worker update the logical matrix 50 manually using a tape measure. Typically, only a small percentage of the racks 23 are actually measured, and the locations of the remaining racks 23 are estimated based on those that are manually measured. To the extent that not all of the racks 23 are measured, this approach has the drawback that it is inaccurate with respect to the unmeasured racks 23. To the extent that all of the racks 23 are manually measured, this approach has the drawback that it is very time consuming.

A second prior art method is to utilize a real time closed circuit TV camera having cross hairs. In this approach, the carriage 16 travels to each rack 23. At each rack 23, a worker studies the picture generated by the TV camera (i.e., by lining up the cross hairs with the rack structure) to determine how to modify the logical matrix 50. Given that the warehouse rack structure 21 may contain thousands of racks, a worker may spend many hours staring at the closed circuit TV. Hence, this process tends not only to be time consuming but also to involve a large potential for human error.

Hence, prior art systems suffer the following drawbacks: they are time-consuming to perform, they are inaccurate, they involve a large potential for human error, and/or they require a large amount of human involvement. To date, an acceptable automated method of mapping rack structures has not been developed.

SUMMARY OF THE INVENTION

A method and apparatus for mapping a warehouse rack structure for a storage and retrieval machine is presented. Specifically, a method of mapping a warehouse rack structure according to the present invention comprises the steps of creating a logical matrix and updating said logical matrix. The updating step further includes the steps of causing a moveable device to travel to a first one of the plurality of racks, and producing a first machine-readable distance measurement output. The machine-readable distance measurement output is produced using a first sensor and represents a distance between the first sensor and a first position on the warehouse rack structure.

A system for mapping a warehouse rack structure comprises a storage and retrieval machine; a rack structure; a logical matrix; and a computer. The storage and retrieval machine has first and second ultrasonic sensors mounted thereon. The rack structure includes a plurality of racks. The logical matrix defines means for storing horizontal position information and vertical position information for each of said plurality of racks. The computer updates the logical matrix based on distance measurements made by the first and second ultrasonic sensors.

The present invention therefore has the following advantages. First, because the outputs of the sensors are machine readable, it is possible to automate nearly the entire mapping procedure. There is generally no need for human involvement once an initialization procedure is complete. This greatly reduces the amount of operator time which must be spent mapping the rack structure. Additionally, because nearly all of the mapping procedure is automated, it is relatively easy to map every rack of the rack structure. Finally, the logical matrix created by the present invention is highly accurate. In part, this is because the coordinates for all of the racks get updated. In part, this is also because the potential for human error is greatly reduced.

Other objects, features, and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which:

FIGS. 6A and 6B are flowcharts illustrating steps for mapping a warehouse in accordance with the present invention.

DETAILED DESCRIPTION OF THE PREFERRED EMBODIMENT

Figure 3:
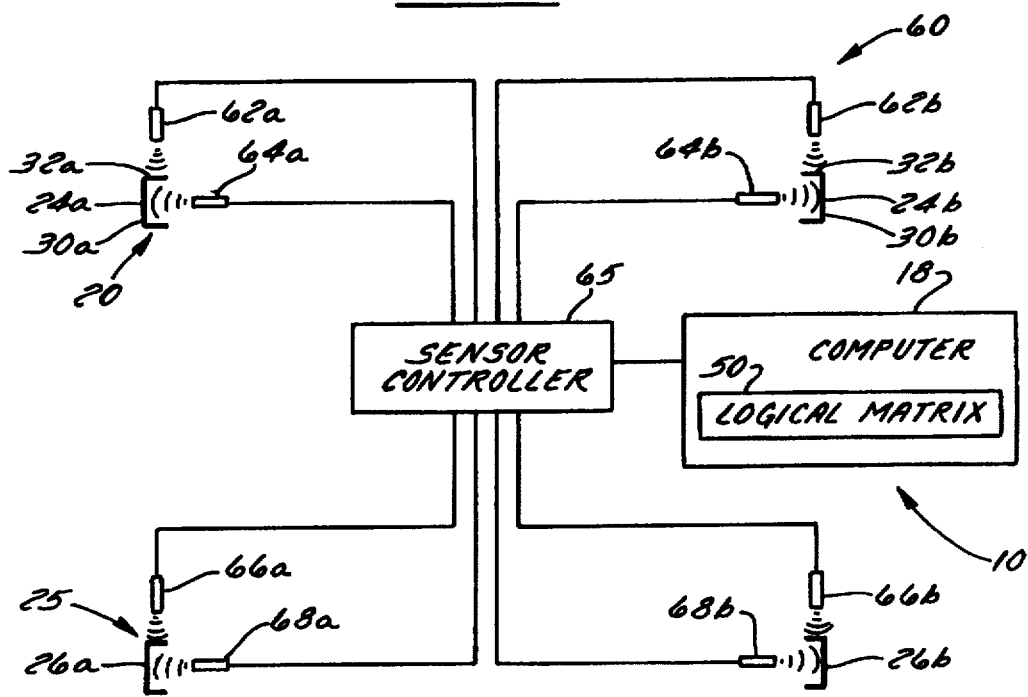
FIG. 3 is an electrical schematic representation of a system which maps a rack structure in accordance with the present invention.

Referring now also to the remaining figures, FIG. 3 is a schematic representation of a system 60 which maps a rack structure 21 in accordance with the present invention. The system 60 preferably includes a storage and retrieval machine (SRM) 10 including the computer 18, the logical matrix 50, a sensor controller 65, and up to eight ultrasonic sensors 62a, 62b, 64a, 64b, 66a, 66b, 68a and 68b.

The SRM 10 preferably has a highly accurate horizontal and vertical control system (not illustrated) which can deliver the base 12 and the carriage 16 precisely to desired locations. Preferably, the computer used to operate the highly accurate control system is the same computer used to store the logical matrix 50, and is preferably an IBM compatible computer, having a 486 or Pentium microprocessor. However, the computer be a much simpler device, such as a programmable logic controller.

Figure 4:
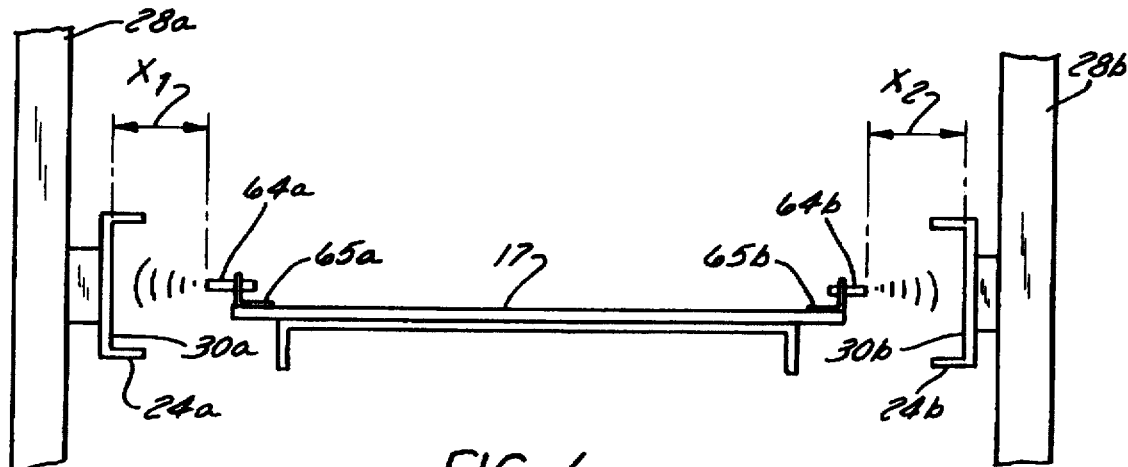
FIG. 4 is a physical embodiment of a portion of the system of FIG. 3, and in particular the portion which measures the horizontal locations of two load arms in a rack structure, in accordance with the present invention.

The computer 18 stores the logical matrix 50 and is coupled to the sensor controller 65. The sensor controller 65 preferably has eight unique inputs, to which are connected the ultrasonic sensors 62a–68b. As shown in FIGS. 3–4, the sensors 62a–68b are mounted to the shuttle 19 via mounting brackets 63, 65a and 65b such that the sensors 62a–68b may extend into the racks 23 of the rack structure 21.

The sensors 62a–68b should be ultrasonic sensors capable of reflecting an ultrasonic sound wave off an object. (Ultrasonic sensors are desirable because of their characteristic high degree of accuracy as well as their immunity to variations in an object's surface.) By measuring the amount of time required for the sound wave to return, each sensor 62a–68b can determine the distance between itself and the distance object.

Figure 1:
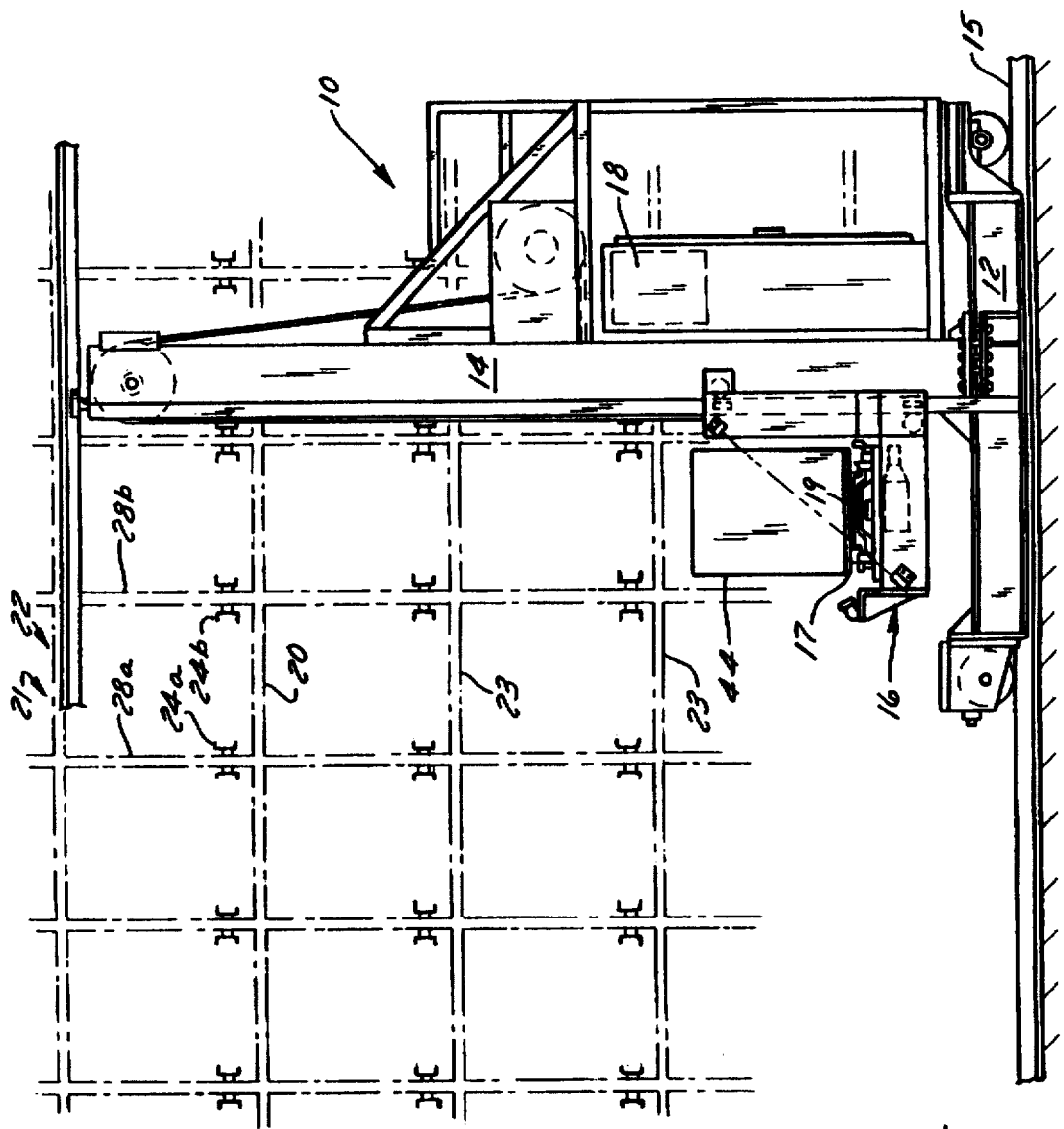
FIG. 1 is a storage and retrieval machine accessing a rack structure which may be mapped in accordance with the present invention.

One sensor is used for each of the eight measurements which need to be made. At each carriage position, there are two racks to be measured. The first rack 20 is located in the first rack structure 21, and a second rack 25 is located in a second rack structure (not illustrated) directly across from the rack 20 on the other side of the SRM 10 (i.e., as the SRM 10 is illustrated in FIG. 1). For each of the racks 20 and 25, four measurements must be made: two horizontal measurements and two vertical measurements. The two horizontal measurements determine the horizontal position of the shuffle table 17 with respect to the sides 30a and 30b of the load arms 24a and 24b, respectively. The two vertical measurements determine the vertical position of the shuttle table 17 with respect to the tops 32a and 32b of the load arms 24a and 24b, respectively. Hence, in total, eight distance measurements are required to map the two racks 20 and 25.

Of course, as little as one sensor could be used. For example, one sensor could be used if the SRM 10 is provided with a control system and machinery for moving the sensor around and taking different measurements. Alternatively, one sensor could be used to if it takes one measurement at a time, and is subsequently manually moved to each of the eight different positions. However, it is generally more cost effective to simply use a plurality of sensors, and therefore using a plurality of sensors is the preferred approach. (On the other hand, this is not to say that the preferred approach is to use all eight sensors simultaneously. Rather, as discussed below, the preferred approach is to use the sensors 62–68b sequentially, four sensors at one time.)

Figure 2:
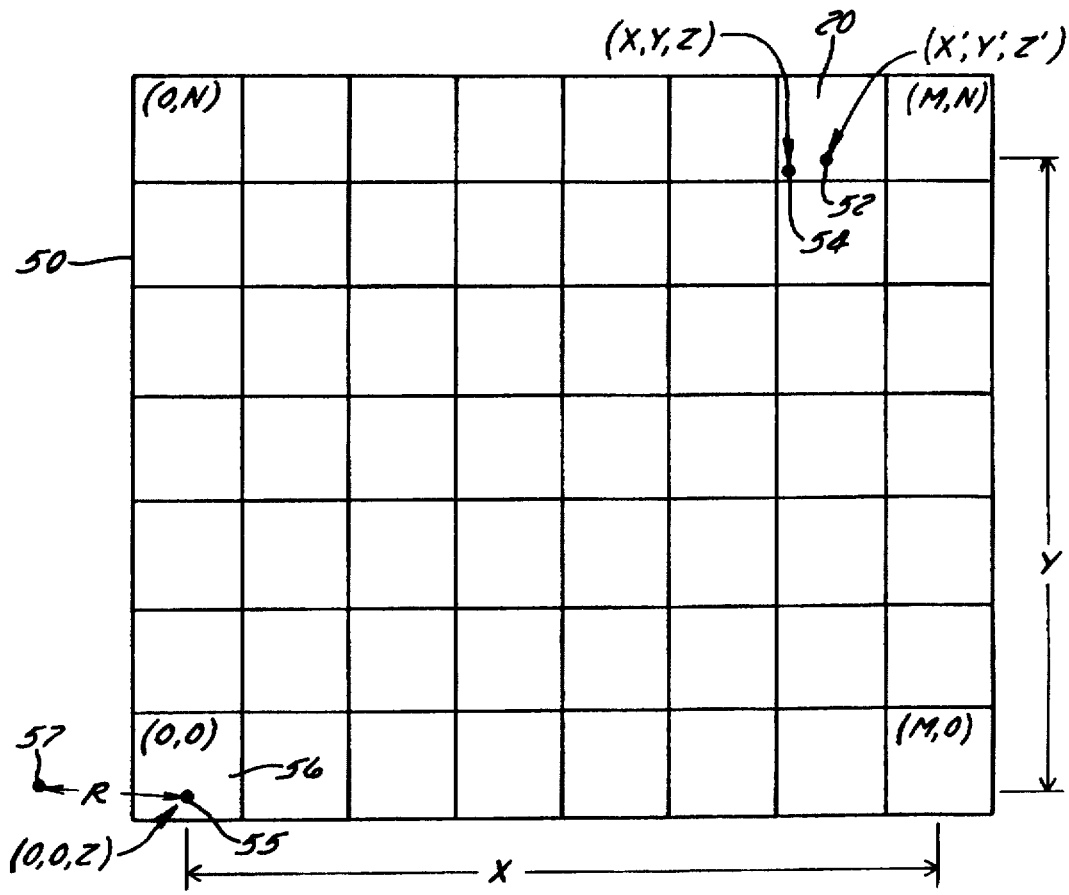
FIG. 2 is a graphical representation of a logical matrix which is used to describe a rack structure and which is updated in accordance with the present invention.

Referring again to FIG. 2, the goal of the mapping system 60 is to accurately describe the rack structure 21 so that, each time the shuttle table 17 is extended into a rack of the rack structure 21, it is nearly perfectly positioned. Specifically, the logical matrix 50 initially stores coordinates (X,Y,Z) (which denote respectively the horizontal centerline of an initial entry point 54, the vertical height of the initial entry point 54, and the extend distance for the shuttle table 17). As illustrated in FIG. 2, the initial entry point 54 having coordinates (X,Y,Z) is shown to be somewhat off center and to be too low vertically, and thus is in need of improvement.

To improve the positioning of the shuttle table 17 in the rack 20, the logical matrix 50 is updated to contain the coordinates (X',Y',Z') rather than the coordinates (X,Y,Z). Based on the coordinates (X',Y',Z'), the shuttle table 17 will enter at a desired entry point 52. As illustrated in FIG. 2, the entry point 52 is horizontally centered in the rack 20. In practice, the desired entry point is likely to be centered horizontally in the rack but not vertically. In particular, it is generally desirable to have the shuttle table 17 enter at a vertical distance which is about one inch below the top portions 32a and 32b of the load arms 24a and 24b, respectively.

FIG. 4 is a physical embodiment of a portion of the system of FIG. 3, and in particular the portion which measures the horizontal locations of two load arms in a rack structure. For clarity, only the shuttle table 17, the sensors 64a and 64b, and brackets 65a and 65b of the SRM 10 are illustrated. The shuttle table 17 is shown extended into the rack 20. The shuttle table 17 is positioned generally between the load arms 24a and 24b which are mounted to rack support columns 28a and 28b, respectively. The ultrasonic sensors 64a and 64b are mounted to the shuffle table 17 by the brackets 65a and 65b, respectively. The ultrasonic sensors 64a and 64b emit ultrasonic waves which are reflected off side portions 30a and 30b of the load arms 24a and 24b, respectively. By measuring the amount of time required for the ultrasonic waves to return, the sensor 64a can determine the distance ($X_1$) between itself and the side portion 30a of the load arm 24a. Similarly, by measuring the amount of time required for the ultrasonic waves to return, the sensor 64b can determine the distance ($X_2$) between itself and the side portion 30b of the load arm 24b.

In the preferred embodiment, the logical matrix 50 is updated such that the coordinates of the rack 20 imitate the coordinates of a reference rack 56. To understand what is meant by this, it is helpful to consider an alternative (non-preferred) approach. According to the alternative approach, the sensors 64a and 64b would be identically mounted on the shuttle table 17. The distance measurements would then be used to generate an error value. For example, assume that $X_1=3"$ and $X_2=2.5"$. The average ($X_{AVG}$) of these distances is 2.75". The error ($X_{ERR}=X_1-X_{AVG}$; $X_{ERR}=X_2-X_{AVG}$) in either direction is ±0.25". X would then be adjusted by 0.25" to arrive at X' (i.e, X'=X−0.25"). This approach is not very "user friendly," however, because it requires that the sensors 64a and 64b be identically mounted on the shuttle table 17.

The preferred approach is to make the coordinates of the rack 20 imitate those of the reference rack 56. Hence, in this case, the user need not worry about identically mounting the sensors 64a and 64b. For example, assume the sensors 64a and 64b are not identically mounted, but rather the sensor 64a is mounted 0.5" too far to the right.

During a start-up procedure, the operator first manually centers shuttle table 17 in the reference rack 20. Because the sensors 64a and 64b are not identically mounted, they read $X_1=4.0"$ and $X_2=3.5"$, so that $X_1-X_2=0.5"$. Nevertheless, the operator instructs the computer 18, essentially, "This is the desired horizontal positioning in the rack."

Now assume that at rack 20, the sensors 64a and 64b read $X_1=3"$ and $X_2=2.5"$, respectively. The computer 18 recognizes that, like the reference rack 56, $X_1-X_2=0.5"$. Hence, since the computer was told that the reference rack 56 was perfectly centered, it will treat the rack 20 as perfectly centered. (Note that, in this example, the rack 20 is not as wide as the reference rack 54.)

As another example, assume the same $X_1=4.0"$, $X_2=3.5"$ reference readings. However, this time the sensors 64a and 64b read $X_1=5"$ and $X_2=2.5"$ at the rack 20. Here, the computer 18 will calculate $X_1-X_2=2.5"$. The logical matrix 50 is then updated such that X'=X−1.0". Hence, if the rack 20 is tested again, the sensors 64a and 64b will read $X_1=4.0"$ and $X_2=3.5"$, meaning that the shuttle table 17 is at the desired horizontal position (i.e., perfectly centered).

Updating the rack 20 in this manner is highly advantageous in that it greatly simplifies setting up the SRM 10 for automatic mapping. It permits the sensors 62a–68b to mounted to the shuffle table 17 in virtually any manner. For example, the sensors 64a and 64b could be simply duct-taped to the shuttle table 17.

Figure 5:
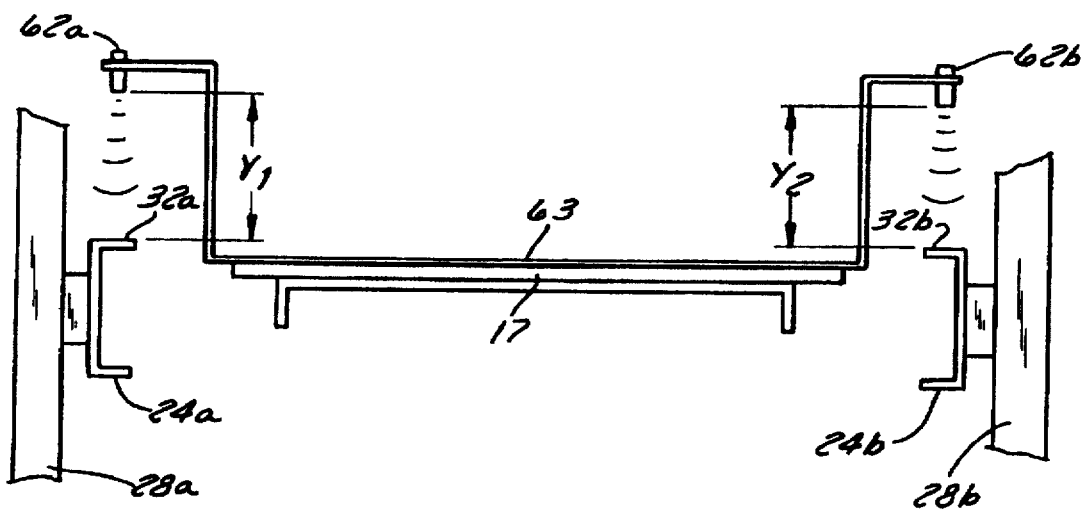
FIG. 5 is a physical embodiment of a portion of the system of FIG. 3, and in particular the portion which measures the vertical locations of two load arms in a rack structure, in accordance with the present invention.

FIG. 5 is a physical embodiment of a portion of the system of FIG. 3, and in particular the portion measuring the vertical locations of two load arms in a rack structure. Again, for clarity, only the shuttle table 17, bracket 63, and the sensors 62a and 62b are illustrated. The shuffle table 17 is again shown extended into the rack 22 and is positioned between the load arms 24a and 24b. The ultrasonic sensors 62a and 62b are mounted to the shuttle table 17 by the bracket 63. The ultrasonic sensors 62a and 62b emit ultrasonic waves which are reflected off top portions 32a and 32b of the load arms 24a and 24b, respectively. By measuring the amount of time required for the ultrasonic waves to return, the sensor 62a can determine the distance ($Y_1$) between itself and the top portion 32a of the load arm 24a. Similarly, by measuring the amount of time required for the ultrasonic waves to return, the sensor 62b can determine the distance ($Y_2$) between itself and the top portion 32b of the load arm 24b.

Again, the preferred approach is to make the coordinates of the rack 20 imitate those of the reference rack 56. Hence, the user also need not worry about identically mounting the sensors 62a and 62b. For example, assume the sensors 62a and 62b are not identically mounted, but rather the sensor 62a is mismounted by 0.5".

During a start-up procedure, the operator vertically positions shuttle table 17 in the reference rack 20. Because the sensors 62a and 62b are not identically mounted, they read $Y_1=4.0"$ and $Y_2=3.5"$, such that $Y_1-Y_2=0.5"$. Nevertheless, the operator instructs the computer 18, essentially, "This is the desired vertical positioning in the rack." At rack 20, assume the sensors 62a and 62b read $Y_1=3"$ and $Y_2=2.5"$, respectively. The computer 18 recognizes that, like the reference rack 56, $Y_1-Y_2=0.5"$. The computer then updates the logical matrix such that Y'=Y+1.0". Hence, if the rack 20 is tested again, the sensors 64a and 64b will read $Y_1=4.0"$ and $Y_2=3.5"$, meaning that the shuttle table 17 is at the desired vertical position.

FIGS. 6A and 6B are flowcharts illustrating the preferred steps for mapping a warehouse in accordance with the present invention. FIG. 6A illustrates that, in the preferred embodiment, the rack structure 21 is mapped in two phases: first the horizontal updates are made in step 82, and second the vertical updates are made in step 84. The reason for performing all of the horizontal updates first is as follows. Referring to FIGS. 3–4, it can be seen that side portions 30a and 30b of load arms 24a and 24b present a much larger reflective surface than top portions 32a and 32b. Consequently, the vertical positioning of the shuttle table 17 when making the horizontal measurements is less critical than the horizontal positioning of the shuttle table 17 when making the vertical measurements.

Specifically, in step 82, the logical matrix 50 is completely non-updated. However, since the side portions 30a and 30b present relatively broad reflective surfaces, there is still a good chance that the sensors 64a and 64b will see the side portions 30a and 30b. In step 84, the logical matrix has been updated with respect to the horizontal coordinates. Hence, in spite of the fact that top portions 32a and 32b present relatively narrow reflective surfaces, there is still a good chance that the sensors 62a and 62b will see the top portions 32a and 32b, since the sensors 62a and 62b are likely to be properly positioned horizontally within the rack 20.

Each of the steps 82 and 84 (i.e., the horizontal updating phase and the vertical updating phase) comprises a plurality of sub-steps, as illustrated in FIG. 6B. Of course, it should be understood that it may not be necessary for all of the illustrated steps to be performed, and that those steps which are performed do not necessarily need to be performed in the order illustrated.

A first step 92 is to create the logical matrix 50 which describes the rack structure 21. (In practice, if the updating is performed in two phases 82 and 84 as suggested, this and several other steps in FIG. 6B could be performed simultaneously for both phases 82 and 84.) The initial logical matrix 50 may be created in virtually any manner. However, since blueprints of rack structures usually exist, it is usually easiest to base the initial logical matrix 50 on the rack structure blueprints.

After creating the logical matrix 50, it is necessary to determine the reference rack offset (R) in step 94. As illustrated in FIG. 2, the reference rack 56 is typically chosen such that it is the first rack (horizontally and vertically) that is encountered in the rack structure. The entry point 55 of the reference rack therefore has coordinates (0,0,Z) as illustrated. However, the SRM 10 determines its own position based on an external reference 57, such as a home switch or a location on a back wall of the warehouse. The reference rack offset R is the distance between the reference rack and the external reference. The reference rack offset R is used by the SRM 10 to determine its own position within the coordinate system established by the logical matrix 50.

Next, in step 96, it is typically necessary to calibrate at least one distance meter of the SRM 10. As the SRM 10 moves about the rack structure 21, it is necessary for it to monitor its own position. Since the assumption herein is that the rack structure 21 has not been completely mapped, it is likely that the SRM system was recently installed and is therefore in need of calibration.

In step 98, at least some of the sensors 62a–68b are connected to the sensor controller 65 and are mounted on the shuttle table 17. As described above, the step 98 is greatly simplified by the fact that the sensors need not be identically mounted on the shuttle table 17.

In step 100, the shuttle table is manually positioned in the reference rack 56. If the logical matrix 50 is being updated with respect to the horizontal coordinates, then special attention is given to ensuring the shuttle table 17 is horizontally centered between the load arms 24a and 24b. If the logical matrix 50 is being updated with respect to the vertical coordinates, then special attention is given to ensuring the shuttle table 17 is the desired distance (e.g., 1.0") below the top portions 32a and 32b of load arms 24a and 24b.

The next two steps 102 and 104 verify that the sensors have been properly connected to the sensor controller 65. In step 102, the sensor controller 65 verifies that at least some combination of sensors are connected. In step 102, the sensor controller 65 verifies that the combination of sensors is reasonable. Typically, if an ultrasonic sensor is connected to an input of the sensor controller 65, the sensor controller 65 will receive an input of at least 0.4 volts. If nothing is connected to an input of the sensor controller 65, it will read zero volts. Hence, it is thereby possible to detect whether a sensor is properly connected to a given input.

For example, if it is desired to update all of the horizontal coordinates, then the operator would connect sensors 64a, 64b, 66a and 66b to the sensor controller 65. By mistake, however, the operator may accidentally connect the sensor 66b to the sensor controller input designated for sensor 68b. The sensor controller 65 then detects that an unreasonable sensor combination exists (i.e., three horizontal sensors and one vertical sensor), and issues a fault. If, on the other hand, the sensors 64a, 64b, 66a and 66b have been properly connected, then the sensor controller 65 permits the mapping procedure to proceed.

Assuming the shuttle table 17 is properly positioned in the reference rack 56 and the sensors are properly connected, then the operator sets the reference reading in step 106. In this step, the operator instructs the computer 18, essentially, "This is the desired horizontal positioning in the rack." Alternatively, if the vertical coordinates are being updated, the operator instructs the computer 18, essentially, "This is the desired vertical positioning in the rack." In practice, this step is likely to consist of simply entering a few keystrokes on the computer 18.

Having completed all of the initialization-type steps, the operator is ready to commence an autoconfiguration procedure in step 108. Generally, pursuant to this procedure, the SRM 10 automatically updates the rest of the logical matrix 50, and operator involvement is unnecessary. Indeed, the ability to automatically update the logical matrix 50 with minimal human operator involvement is a primary benefit of the present invention.

In step 110, the SRM 10 moves to the next rack location. "Next" can mean a variety of things, depending on the situation. For example, when moving on from the reference rack 56, the "next" rack is likely to be the rack (not illustrated) across the aisle from the reference rack 56 in the second rack structure (not illustrated). After the rack across the aisle has been updated, the "next" rack may be the rack located in the first level of the column next to the reference rack 56. After all of the racks 53 of a given level have been updated, the "next" rack will be a rack on the next vertical level. The point is that, eventually, all of the racks of the rack structure will be updated. Advantageously, as previously mentioned, this can be accomplished automatically via a programming of the control system (not illustrated) of the SRM 10.

Assuming now that the coordinates of the rack 20 are being updated, ultrasonic waves are directed at the load arms 24a and 24b in step 112. If the horizontal coordinates are being updated, the waves are directed at the side portions 30a and 30b of the load arms 24a and 24b. (If the vertical coordinates are being updated, the waves are directed at the top portions 32a and 32b of the load arms 24a and 24b.)

In step 114, the distance to the load arms 24a and 24b from the sensors 64a and 64b is determined by measuring the amount of time it takes for the ultrasonic waves to return to the sensors 64a and 64b. Since the sensors 64a and 64b operate accurately only within certain ranges, it is then necessary in step 116 to verify that the measurement is within the accurate range of the sensors 64a and 64b.

Assuming the measurement is within the accurate range of the sensors 64a and 64b, then the measurement is compared with the measurements of the reference rack 56 in step 118. Based on this comparison, the system 60 in step 120 determines the adjustments necessary to make the rack 20 look like or imitate the reference rack 56. In step 122, these adjustments are made to the rack 20 coordinates stored in the logical matrix 50.

In step 124, it is ascertained whether the rack 20 is the last rack to be mapped. If not, then the SRM 10 and/or shuttle table 17 moves to the next rack pursuant to step 110. If so, then this phase of the mapping procedure is complete.

Many changes and modifications could be made to the invention without departing from the spirit thereof. It is to be understood that embodiments of the present invention not disclosed herein are fully intended to be within the scope of the appended claims.

We claim:

1. A method of mapping a rack structure having a plurality of racks, the method comprising the steps of:
    creating a logical matrix, said logical matrix storing information pertaining to the locations of said plurality of racks, and said logical matrix forming an initial map of said rack structure;
    updating said logical matrix, said updating step including the steps of
        causing a moveable device to travel to a first rack, said first rack being one of said plurality of racks,
        producing a first machine-readable distance measurement output, said producing step including the step of using a first sensor which produces said first machine-readable distance measurement output, said first machine-readable distance measurement output representing a first distance, said first distance being a distance between said first sensor and a first position on said rack structure,
        and wherein said logical matrix is updated based on said first machine-readable distance measurement output; and
    repeating said updating step for additional racks of said plurality of racks so as to create an updated map of said rack structure, said updated map being more accurate than said initial map.

2. A method of mapping a warehouse rack structure having a plurality of racks, the method comprising the steps of:
    creating a logical matrix, said logical matrix storing information pertaining to the locations of said plurality of racks;
    updating said logical matrix, said updating step including the steps of
        causing a moveable device to travel to a first one of said plurality of racks,
        producing a first machine-readable distance measurement output, said producing step including the step of using a first sensor which produces said first machine-readable distance measurement output, said first machine-readable distance measurement output representing a first distance, said first distance being a distance between said first sensor and a first position on said warehouse rack structure,
        producing a second machine-readable distance measurement output, said producing step including the step of using a second sensor which produces said second machine-readable distance measurement output, said second machine-readable distance measurement output representing a second distance, said second distance being a distance between said second sensor and a second position on said warehouse rack structure,
        and wherein said logical matrix is updated based on said first and second machine-readable distance measurement outputs.

3. The method according to claim 2, further comprising the step of defining a reference rack, said defining step including the steps of
    causing a moveable device to travel to a second one of said plurality of racks, said second one of said plurality of racks being said reference rack,
    producing a third machine readable distance measurement output using said first sensor, said third machine-readable distance measurement output representing a third distance, said third distance being a distance between said first sensor and a third position on said warehouse rack structure,
    producing a fourth machine readable distance measurement output using said second sensor, said fourth machine-readable distance measurement output representing a fourth distance, said fourth distance being a distance between said second sensor and a fourth position on said warehouse rack structure;
    and wherein information in said logical matrix regarding said first one of said plurality of racks is updated based on said first, second, third, and fourth machine-readable distance measurement outputs.

4. The method according to claim 3,
    wherein said first, second, third, and fourth distance measurements are horizontal distance measurements;
    wherein said updating step further comprises the steps of:
        producing a fifth machine readable distance measurement output using a third sensor, said fifth machine-readable distance measurement output representing a fifth distance, said fifth distance being a distance between said third sensor and a fifth position on said warehouse rack structure,
        producing a sixth machine readable distance measurement output using said fourth sensor, said sixth machine-readable distance measurement output representing a sixth distance, said sixth distance being a distance between said fourth sensor and a sixth position on said warehouse rack structure;
    wherein said fifth and sixth distance measurements are vertical distance measurements; and
    wherein information in said logical matrix regarding said first one of said plurality of racks is updated based on said first, second, third, fourth, fifth, and sixth machine-readable distance measurement outputs.

5. The method according to claim 4, wherein said first and second distance measurements are produced prior to said fifth and sixth distance measurements.

6. The method according to claim 5, further comprising the step of repeating said updating step until said logical matrix has been updated with respect to all of said plurality of racks.

7. The method according to claim 5, further comprising the steps of
    verifying that at least two sensors of said first, second, third, and fourth sensors are connected to said central controller; and
    verifying that a reasonable combination of said first, second, third, and fourth sensors is connected to said central controller.

8. The method according to claim 1, further comprising the steps of
    defining a reference rack, said defining step further including the step of measuring an offset distance between said reference rack and a position external to said rack structure; and describing, in said logical matrix, substantially all of said plurality of racks with respect to said reference rack.

9. The method according to claim 1, wherein the step of using a first sensor comprises the step of reflecting an ultrasonic sound wave off said first position on said rack structure.

10. A mapping system comprising:

a storage and retrieval machine, said storage and retrieval machine having first and second ultrasonic sensors mounted thereon, said first and second ultrasonic sensors being adapted for making distance measurements;

a rack structure, said rack structure including a plurality of racks;

a logical matrix, said logical matrix storing horizontal position information and vertical position information for each of said plurality of racks, and said logical matrix forming an initial map of said rack structure; and a computer, said computer updating said horizontal position information and said vertical position information stored in said logical matrix based on distance measurements made by said first and second ultrasonic sensors, said logical matrix being updated so as to form an updated map which is more accurate than said initial map.

11. A mapping system comprising:

a storage and retrieval machine, said storage and retrieval machine having first, second, third and fourth ultrasonic sensors mounted thereon;

a rack structure, said rack structure including a plurality of racks;

a logical matrix, said logical matrix storing horizontal position information and vertical position information for each of said plurality of racks; and a computer, said computer updating said logical matrix based on distance measurements made by said first and second ultrasonic sensors;

and wherein said first and second ultrasonic sensors make horizontal distance measurements and said third and fourth ultrasonic sensors make vertical distance measurements.

12. A mapping system comprising:

a storage and retrieval machine, said storage and retrieval machine having first, second, third and fourth ultrasonic sensors mounted thereon;

a rack structure, said rack structure including a plurality of racks, said rack structure including first and second sets of racks, said first and second sets of racks being on opposing sides of said storage and retrieval machine;

a logical matrix, said logical matrix storing horizontal position information and vertical position information for each of said plurality of racks; and a computer, said computer updating said logical matrix based on distance measurements made by said first and second ultrasonic sensors; and wherein said first and second ultrasonic sensors are disposed adjacent said first set of racks; and wherein said third and fourth ultrasonic sensors are disposed adjacent said second set of racks.

13. The system according to claim 12, wherein said storage and retrieval machine further comprises an ultrasonic sensor central controller, said ultrasonic sensor central controller defining means for verifying that at least two sensors of said first, second, third, and fourth sensors are connected to said central controller; and for verifying that a reasonable combination of said first, second, third, and fourth sensors is connected to said central controller.

14. A mapping system comprising:

a storage and retrieval machine, said storage and retrieval machine having first and second ultrasonic sensors mounted thereon;

a rack structure, said rack structure including a plurality of racks;

a logical matrix, said logical matrix storing horizontal position information and vertical position information for each of said plurality of racks;

a reference rack; and a computer, said computer updating said logical matrix based on distance measurements made by said first and second ultrasonic sensors, said computer defining a means for imitating, said means for imitating updating at least one of said horizontal position information and said vertical position information for each of said plurality of racks so as to imitate at least one of horizontal position information and vertical position information pertaining to said reference rack.

15. The system according to claim 10, further comprising a reference rack, said reference rack being of a known offset distance from a position external to said rack structure; and wherein substantially all of said plurality of racks are described in said logical matrix with respect to said reference rack.

16. A method of mapping a warehouse rack structure having a plurality of racks, the method comprising the steps of:

creating a logical matrix, said logical matrix storing horizontal position information and vertical position information for each of said plurality of racks;

updating said logical matrix, said updating step including the steps of causing a storage and retrieval machine to travel to a first one of said plurality of racks, measuring a first distance, said first distance being a horizontal distance between a first ultrasonic sensor and a first position on said warehouse rack structure, said measuring step including the step of using said first ultrasonic sensor to reflect an ultrasonic sound wave off said first position on said warehouse rack structure, and measuring a second distance, said second distance being a horizontal distance between a second ultrasonic sensor and a second position on said warehouse rack structure, said measuring step including the step of using said second ultrasonic sensor to reflect an ultrasonic sound wave off said second position on said warehouse rack structure, and wherein said logical matrix is updated based on said first distance measurement and said second distance measurement.

17. The method according to claim 16, further comprising the step of defining a reference rack, said defining step including the steps of causing a moveable device to travel to a second one of said plurality of racks, said second one of said plurality of racks being said reference rack, measuring a third distance, said third distance being a horizontal distance between said first ultrasonic sensor and a third position on said warehouse rack structure, said measuring step including the step of using said first ultrasonic sensor to reflect an ultrasonic sound wave off said third position on said warehouse rack structure, measuring a fourth distance, said fourth distance being a horizontal distance between said second ultrasonic sensor and a fourth position on said warehouse rack structure, said measuring step including the step of using said second ultrasonic sensor to reflect an ultrasonic sound wave off said fourth position on said warehouse rack structure, and wherein information in said logical matrix regarding said first one of said plurality of racks is updated based on said first, second, third, and fourth distance measurements.

18. The method according to claim 16, wherein said updating step further comprises the steps of measuring a fifth distance, said fifth distance being a vertical distance between a third ultrasonic sensor and a fifth position on said warehouse rack structure, said measuring step including the step of using said third ultrasonic sensor to reflect an ultrasonic sound wave off said fifth position on said warehouse rack structure, measuring a sixth distance, said sixth distance being a vertical distance between a fourth ultrasonic sensor and a sixth position on said warehouse rack structure, said measuring step including the step of using said fourth ultrasonic sensor to reflect an ultrasonic sound wave off said sixth position on said warehouse rack structure, and wherein information in said logical matrix regarding said first one of said plurality of racks is updated based on said first, second, fifth, and sixth distance measurements.

19. The method according to claim 18, further comprising the steps defining a reference rack, said defining step further including the step of measuring an offset distance between a reference position in said reference rack and a position external to said rack structure; and describing, in said logical matrix, substantially all of said plurality of racks with respect to said reference position, said describing step including the step of repeating said updating step until said logical matrix has been updated with respect to substantially all of said plurality of racks.

20. The method according to claim 18, further comprising the steps of verifying that at least two sensors of said first, second, third, and fourth sensors are connected to said central controller; and verifying that a reasonable combination of said first, second, third, and fourth sensors is connected to said central controller.

21. A method of mapping a rack structure having a plurality of racks, the method comprising the steps of:

mapping a position of a first rack within said rack structure, said first rack being one of said plurality of racks, said mapping step including the steps of causing a moveable device to travel to said first rack, automatically generating position information for said first rack, including the steps of producing a first machine-readable distance measurement output, said producing step including the step of using a sensor which produces said first machine-readable distance measurement output, said first machine-readable distance measurement output representing a first distance, said first distance being a distance between said sensor and a first position on said rack structure, and producing a second machine-readable distance measurement output, said second machine-readable distance measurement output representing a second distance, said second distance being a distance between said sensor and a second position on said rack structure, and storing said position information in a memory; and repeating said mapping step for additional racks of said plurality of racks so as to create a map of said rack structure which contains said position information for said first rack and for said additional racks.

22. The method according to claim 21, wherein said map is in the form of an N×M two dimensional matrix, N being a number of levels of said rack structure and M being a number of bays of said rack structure.

23. The method according to claim 21, wherein said sensor includes first and second ultrasonic sensors which respectively produce said first and second machine-readable distance measurement outputs by reflecting ultrasonic sound waves off said first and second positions on said rack structure.

24. The method according to claim 21, further comprising the steps of defining a reference rack, said defining step further including the step of measuring an offset distance between said reference rack and a position external to said rack structure; and describing, in said map, substantially all of said plurality of racks with respect to said reference rack.

25. The method according to claim 21, further comprising the step of creating an initial map and wherein, during said mapping and said repeating steps, initial information contained in said initial map is updated with said position information so as to improve the accuracy of said initial map.

26. The method according to claim 25 wherein, during said causing steps, said moveable device is caused to travel to said first rack and to said additional racks based on said initial information contained in said initial map.

* * * * *